UNITED STATES PATENT OFFICE.

JAMES J. JOHNSTON, OF COLUMBIANA, OHIO, ASSIGNOR TO S. D. HUBBARD & CO., OF PITTSBURG, PENNSYLVANIA.

IMPROVEMENT IN THE MANUFACTURE OF STEEL.

Specification forming part of Letters Patent No. 126,708, dated May 14, 1872.

*To all whom it may concern:*

Be it known that I, JAMES J. JOHNSTON, of Columbiana, county of Columbiana, and State of Ohio, have invented a certain new and useful Improvement in the Manufacture of Steel; and I do hereby declare that the following is a full, clear and exact description thereof.

The nature of my invention consists in mixing pulverized iron ore, nitrate of soda, and manganese together, so as to form a homogeneous mass, which is afterward heated and mixed with molten cast-iron, which is subsequently worked and subjected to a process of cementation for manufacturing it into steel.

To enable others skilled in the art to make and use my invention, I will proceed to describe it more fully.

I take from ten (10) to twenty (20) parts of pulverized iron ore; from two (2) to six (6) parts of nitrate of soda (dissolved in just sufficient water to hold it in solution;) from one (1) to two (2) parts of the black oxide of manganese. The pulverized ore and manganese are mixed thoroughly together, the solution of soda is then sprinkled over the mixed mass, stirring it up so that all parts of it will be brought in contact with the solution; the whole is then allowed to stand exposed to the action of the air for one or two days. It is then heated in a suitable oven to about 600° Fahrenheit, after which, from ten (10) to twenty (20) pounds of this mixed and heated mass, are mixed with about one hundred (100) pounds of molten cast-iron, in the manner and by the means described in the specification forming part of my application for a patent for improvement in the manufacture of wrought-iron, which application bears even date with this. The molten metal, after being mixed with the ore, soda, and manganese, is worked and manipulated in the puddling-furnace, and afterward formed into bar-iron, and then subjected to the ordinary process of cementation, after which it is remelted in a suitable furnace, (such as is used for making "puddled steel,") and subjected to a high degree of heat until the molten mass is free from dirt or other impurities. It is then drawn off into ingot-molds, and afterward heated, hammered, or rolled into the desired form of merchantable steel.

By manufacturing steel in the manner hereinbefore described, a good steel can be produced with great facility, cheaply, and without the use of crucibles.

Having thus described my improvement, what I claim as of invention, is—

In the manufacture of steel, mixing heated pulverized iron ore, nitrate of soda, and the black oxide of manganese with molten cast-iron, substantially as hereinbefore described.

JAMES J. JOHNSTON.

Witnesses:
 WM. W. S. DYRE,
 EDM. F. BROWN.